(12) United States Patent
Hashmi

(10) Patent No.: US 6,286,887 B1
(45) Date of Patent: Sep. 11, 2001

(54) VISOR WITH LONGITUDINAL MOVEMENT SYSTEM

(75) Inventor: M. Anaam Hashmi, P.O. Box 201, Mankato, MN (US) 56002

(73) Assignee: M. Anaam Hashmi, Mankato, MN (US)

( * ) Notice: Subject to any disclaimer, the term of this patent is extended or adjusted under 35 U.S.C. 154(b) by 0 days.

(21) Appl. No.: 09/538,844

(22) Filed: Nov. 12, 1999

Related U.S. Application Data

(63) Continuation-in-part of application No. 09/027,971, filed on Feb. 23, 1998, now abandoned.

(51) Int. Cl.$^7$ .......................................................... B60J 3/02
(52) U.S. Cl. ................................... 296/97.11; 248/292.14
(58) Field of Search ................... 296/97.9, 97.11–97.13; 248/291.1, 292.11, 292.14

(56) References Cited

U.S. PATENT DOCUMENTS

| | | | |
|---|---|---|---|
| 3,870,403 | * 3/1975 | Ward et al. | 296/97.2 X |
| 4,902,063 | * 2/1990 | Crink | 296/97.11 |
| 4,925,233 | * 5/1990 | Clark | 296/97.11 |
| 5,044,687 | * 9/1991 | Abu-Shumays | 296/97.11 |
| 5,158,334 | * 10/1992 | Felland | 296/97.4 |
| 5,951,089 | * 9/1999 | Delus et al. | 296/97.11 |

FOREIGN PATENT DOCUMENTS

| | | | |
|---|---|---|---|
| 0824693 | * 2/1938 | (FR) | 296/97.12 |
| 0567958 | * 3/1945 | (GB) | 296/97.11 |
| 405104949 | * 4/1993 | (JP) | 296/97.11 |

* cited by examiner

Primary Examiner—Dennis H. Pedder

(57) ABSTRACT

Visor with Longitudinal Movement System is a permanent vehicle visor to protect driver and passengers from sun glare and rays from front and rear side windows. Visor is attached above the side window and the Visor can slide to the front or rear-window by the help of a longitudinal sliding system consisting of a railing in the Visor body and circular roller attached to a mounting piece. One Visor can be used to cover upper portion of both front-window or rear-window while the factory mounted front visor (FMFV) is offering protection from sun glare and rays from front windshield. Visor can be stowed on the roof while not in use. For better protection and functionality, an ellipse shape on both ends of rectangular Visor is suggested as one of the embodiments of the invention. Visor with Longitudinal Movement System also be used on front windshield of vehicles in place of the factory mounted front visor (FMFV).

7 Claims, 16 Drawing Sheets

Figure 2:
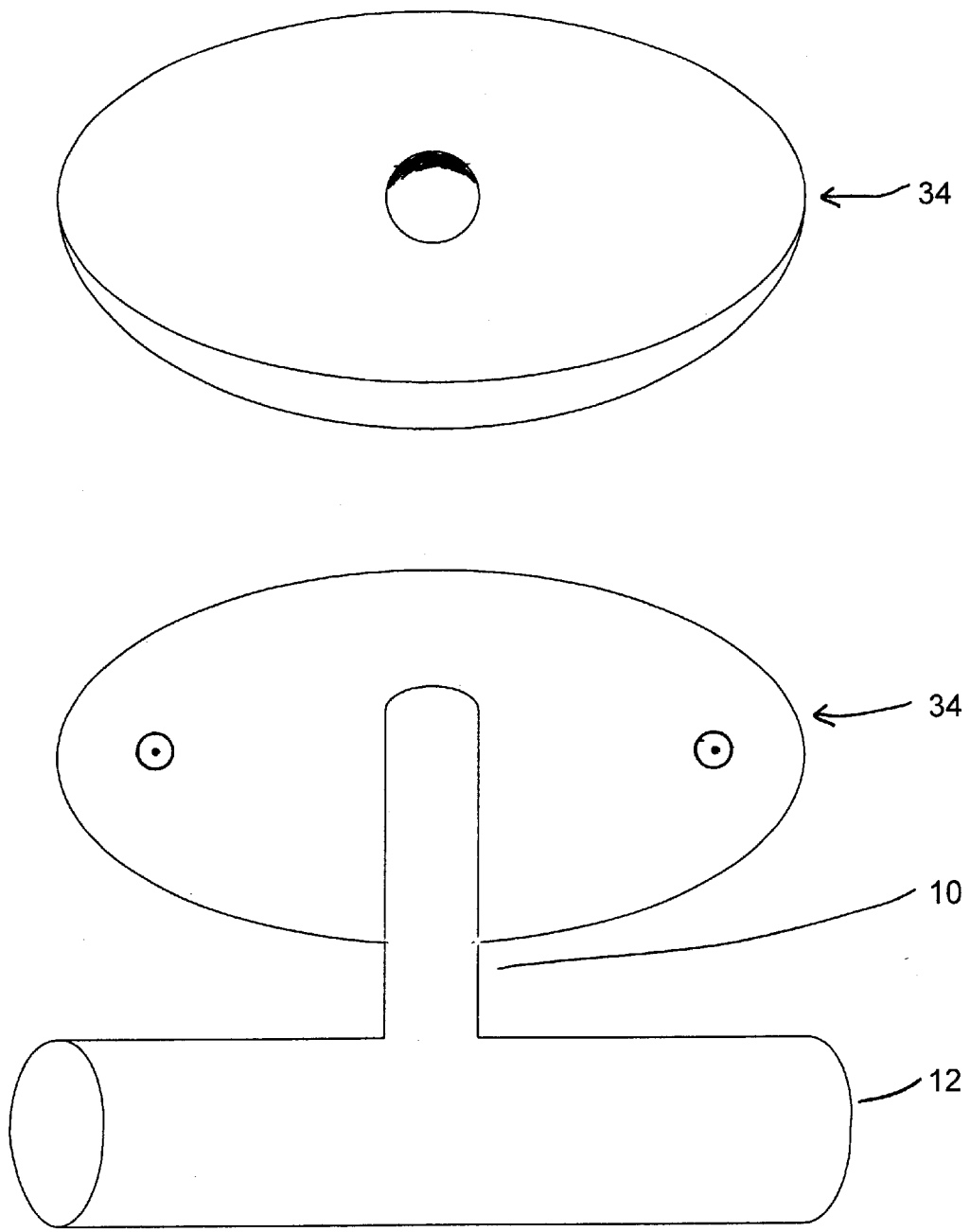

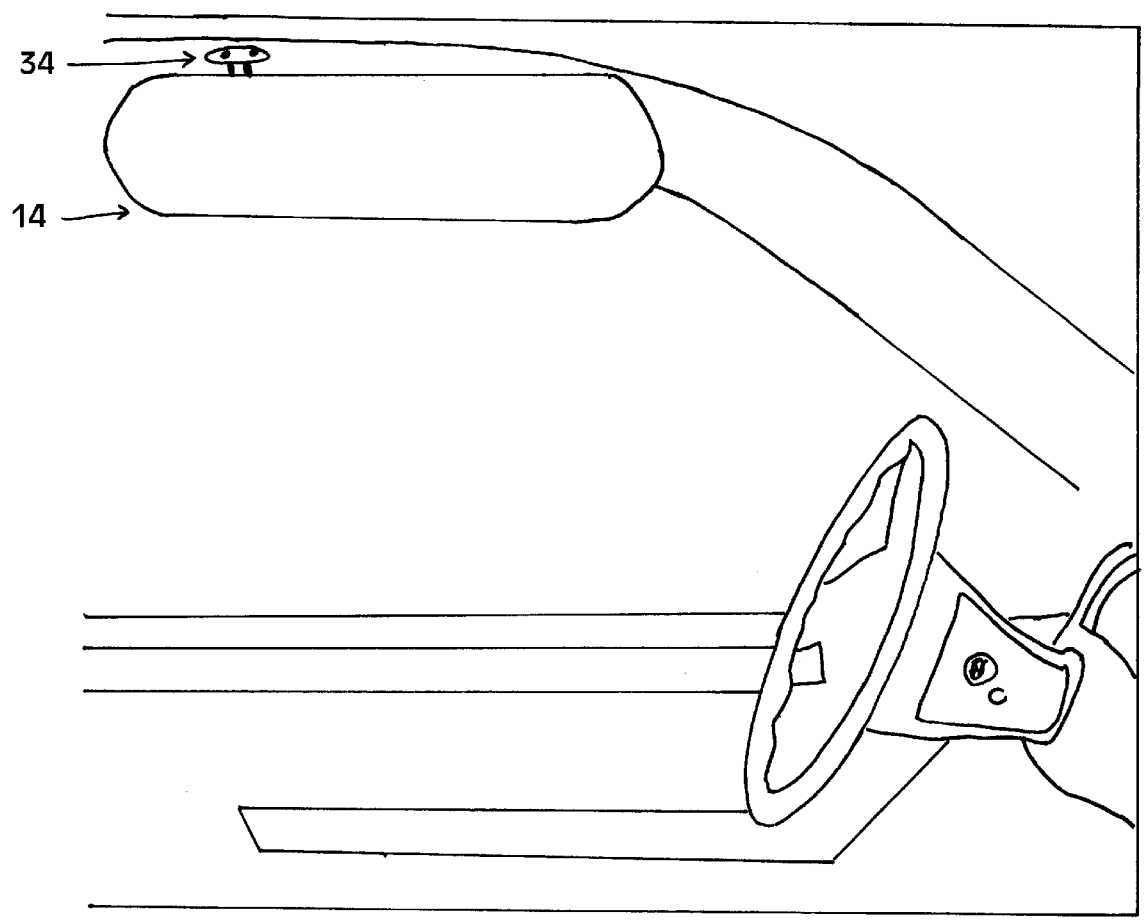
Fig. 1-a

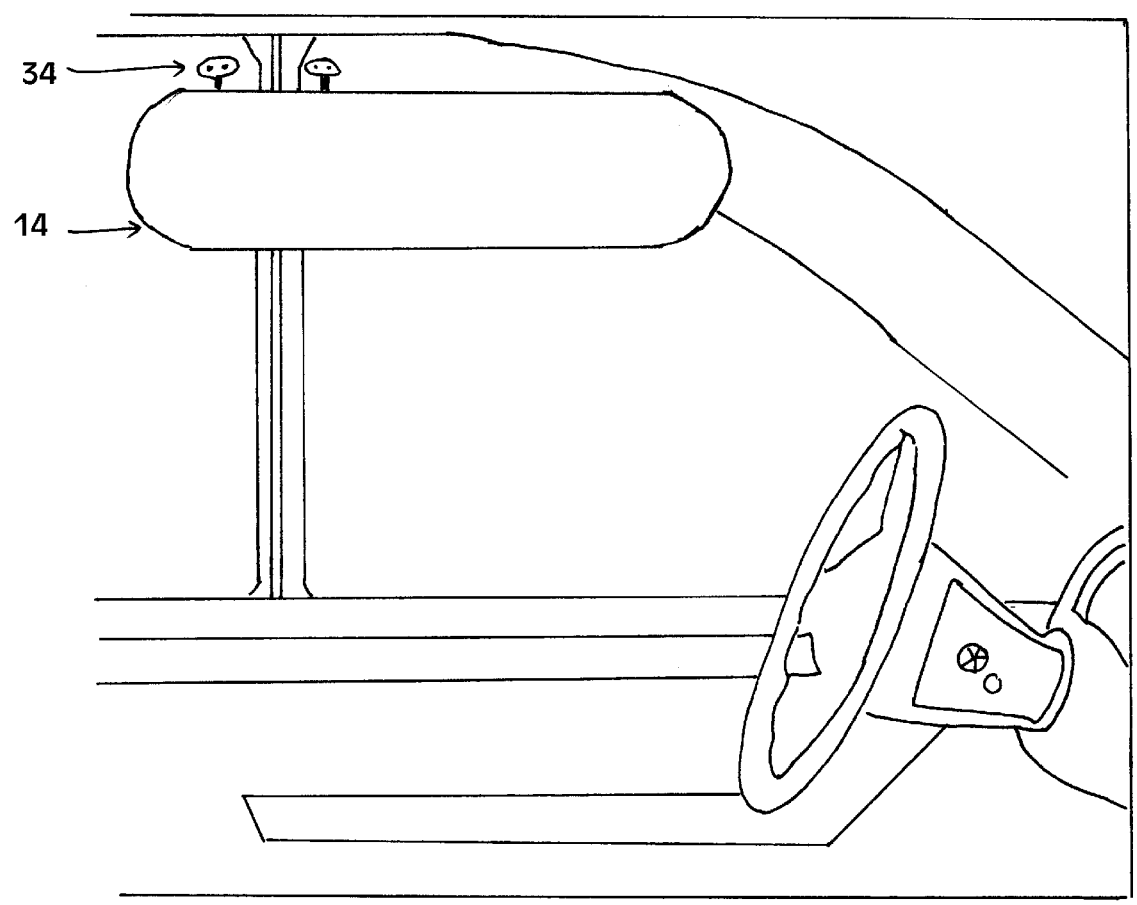
Fig. 1-b

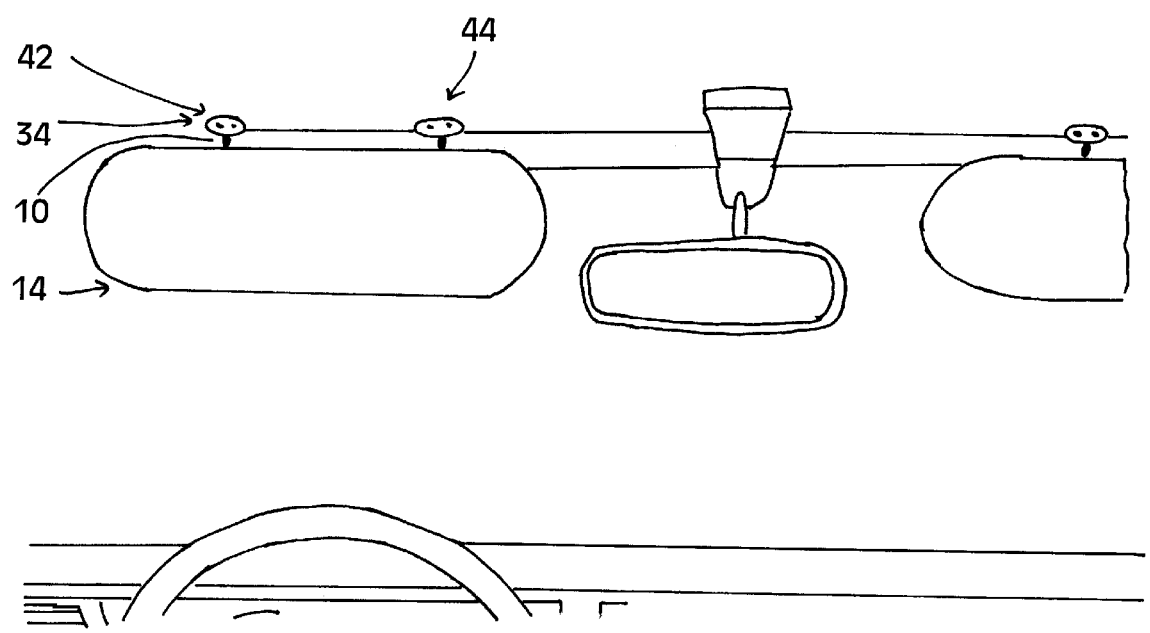
Fig. 1-c

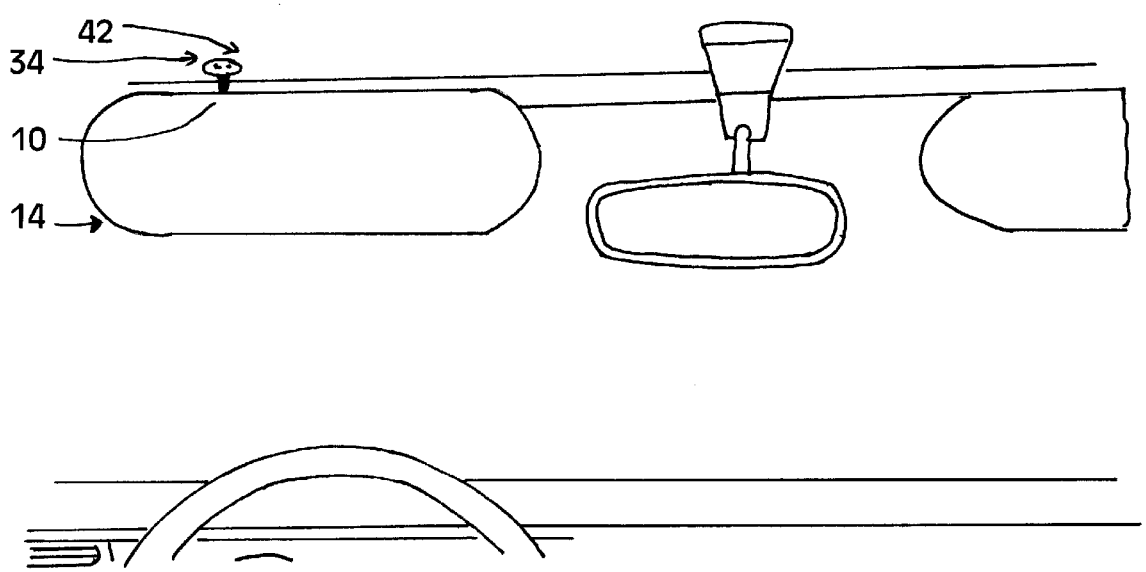
Fig. 1-d

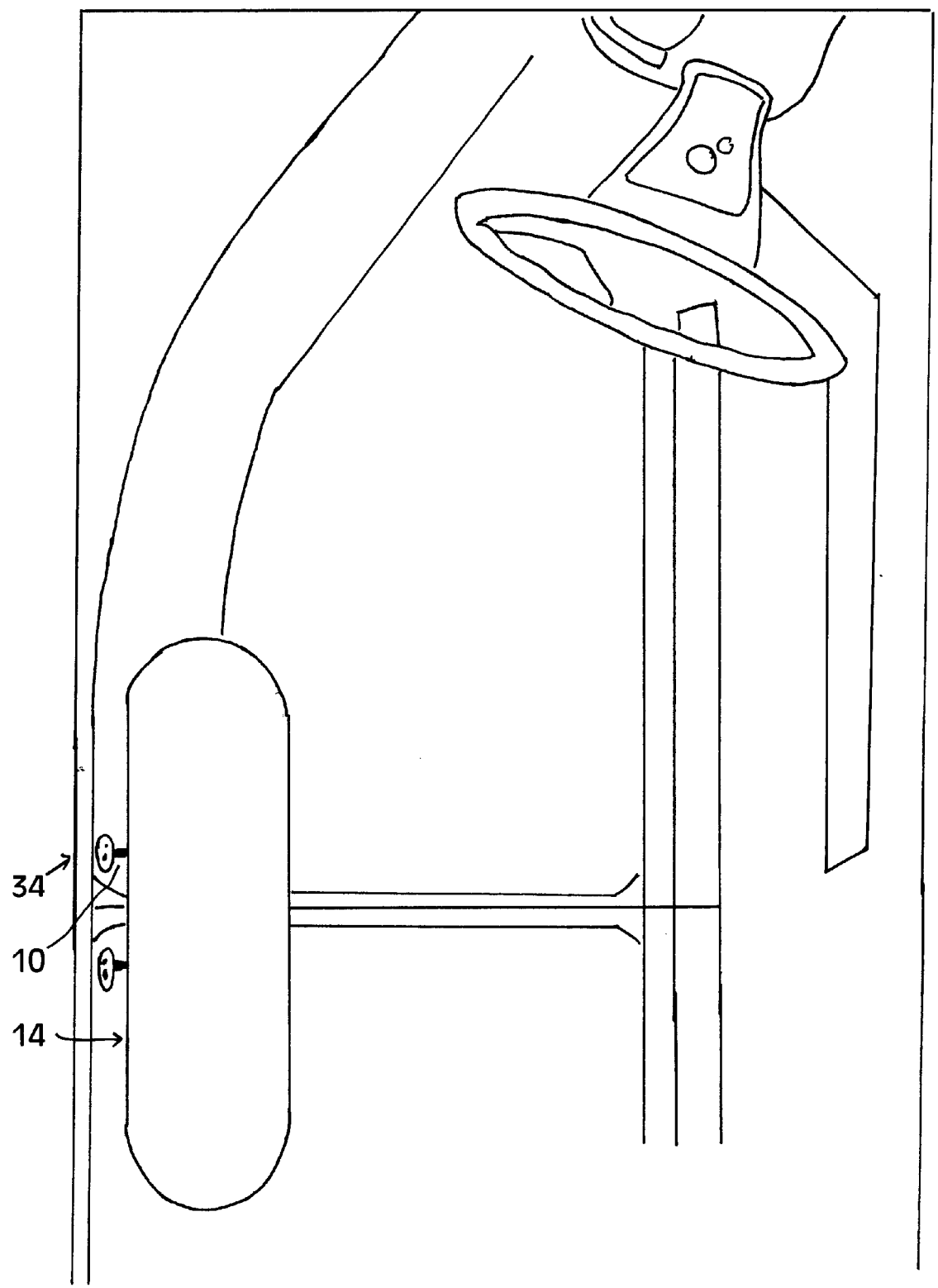
Fig. 1-e

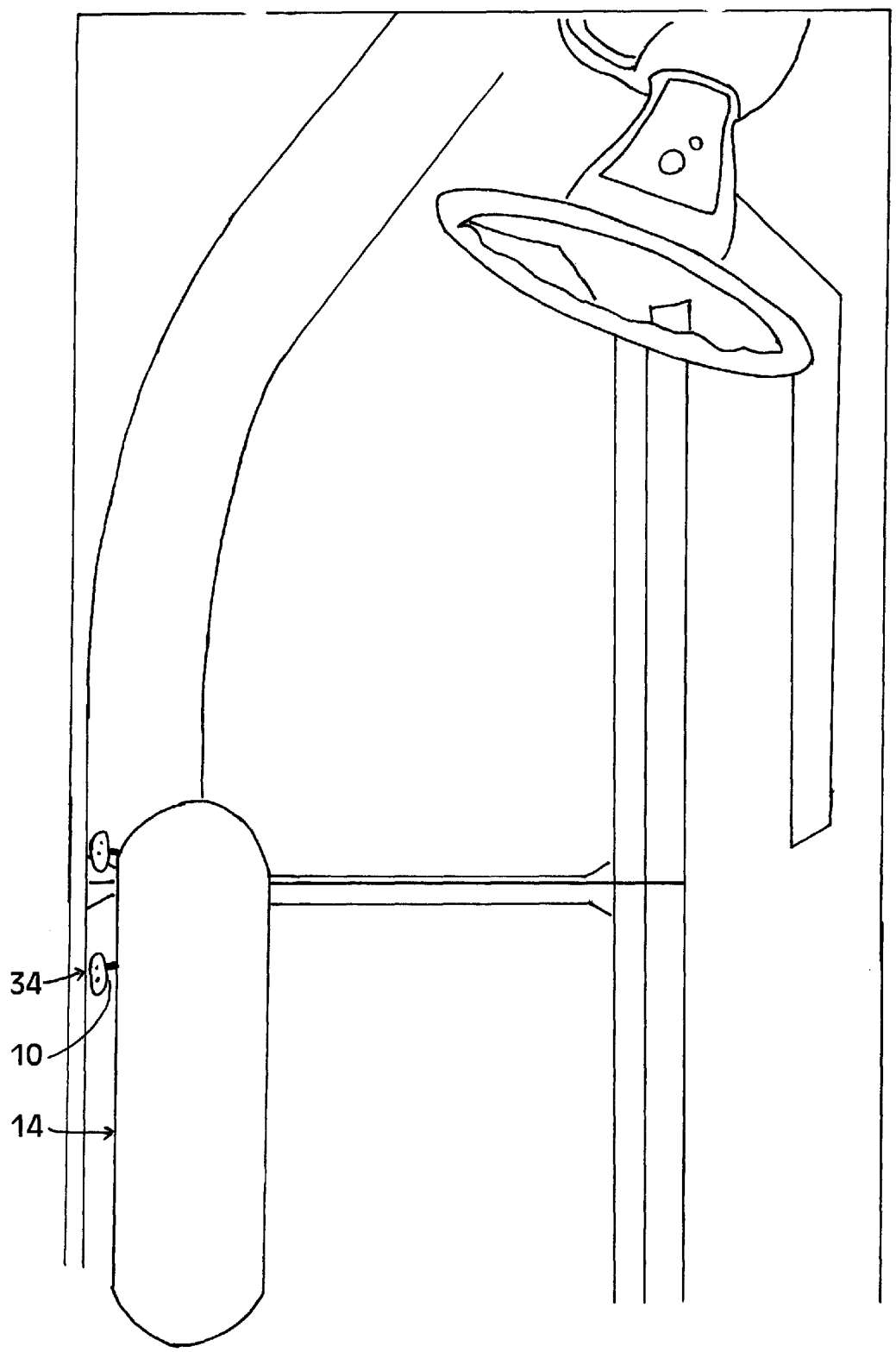
Fig. 1-f

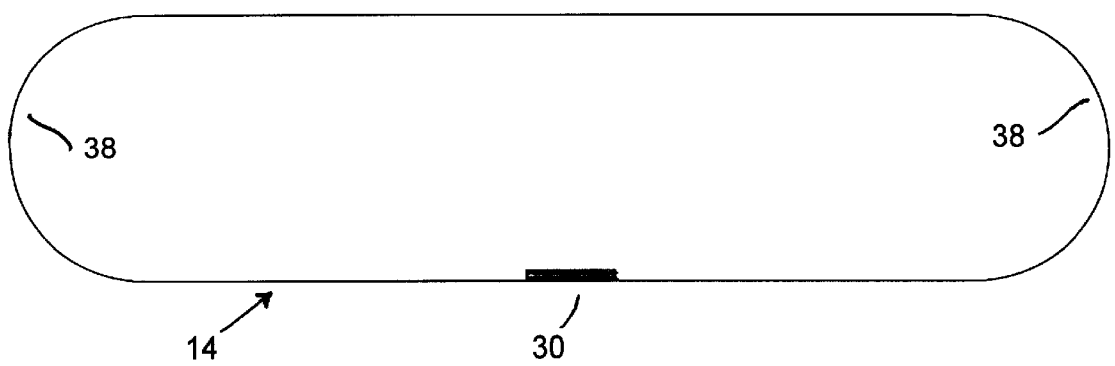
Fig. 1-g

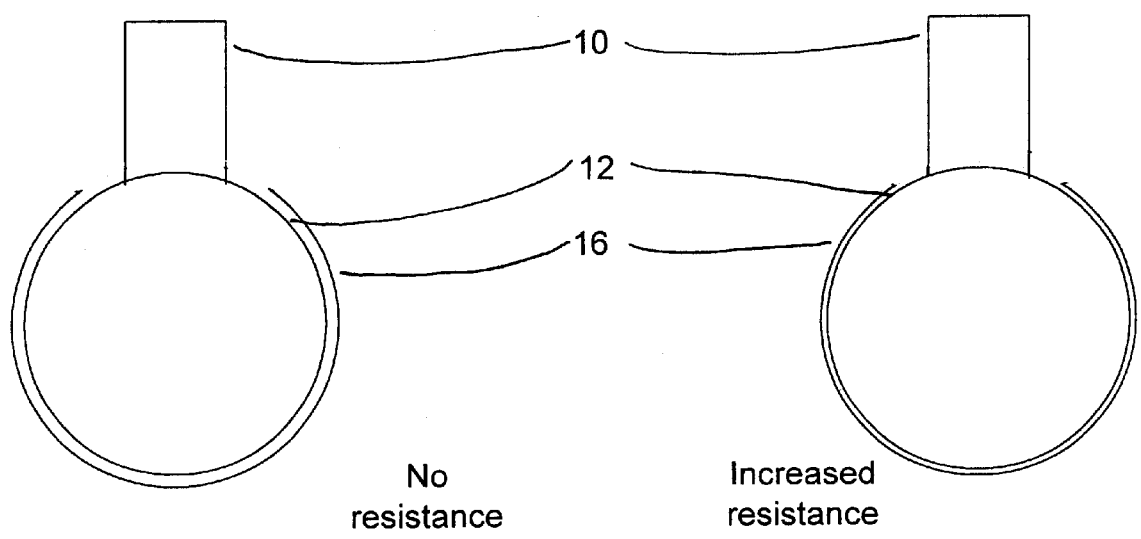
Fig. 3-a     Fig. 3-b

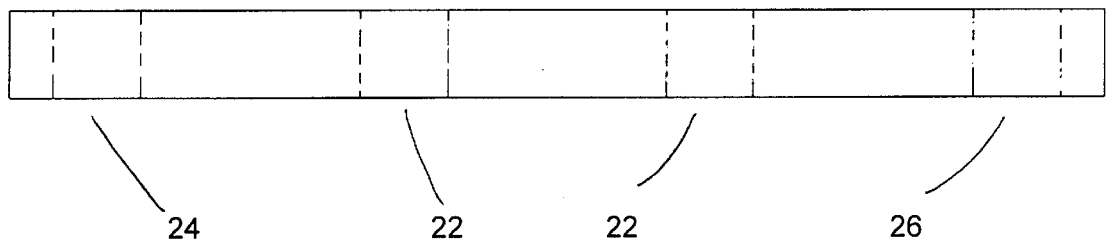
Fig. 3-c
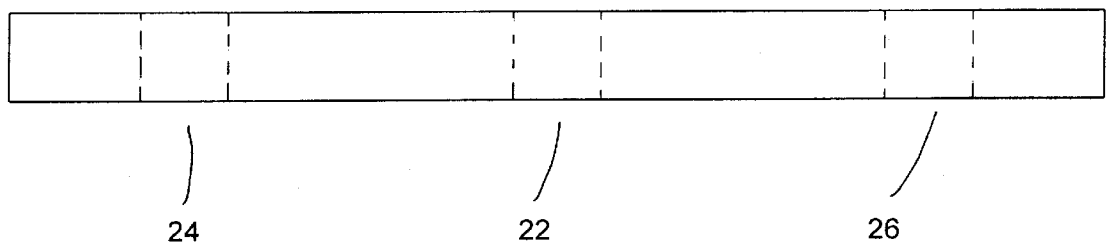
Fig. 3-d

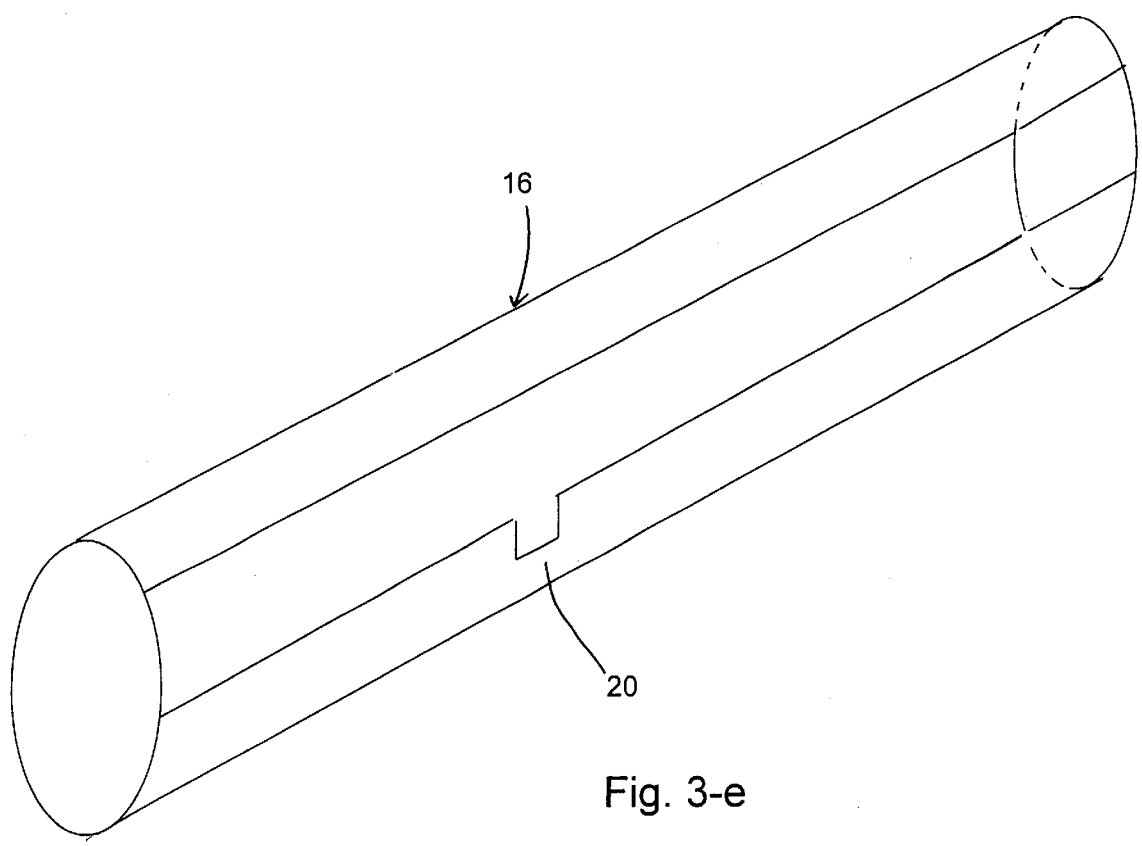
Fig. 3-e

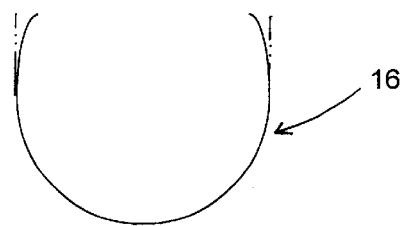
Crossectional view of roller
detachment from railing
Fig. 3-g
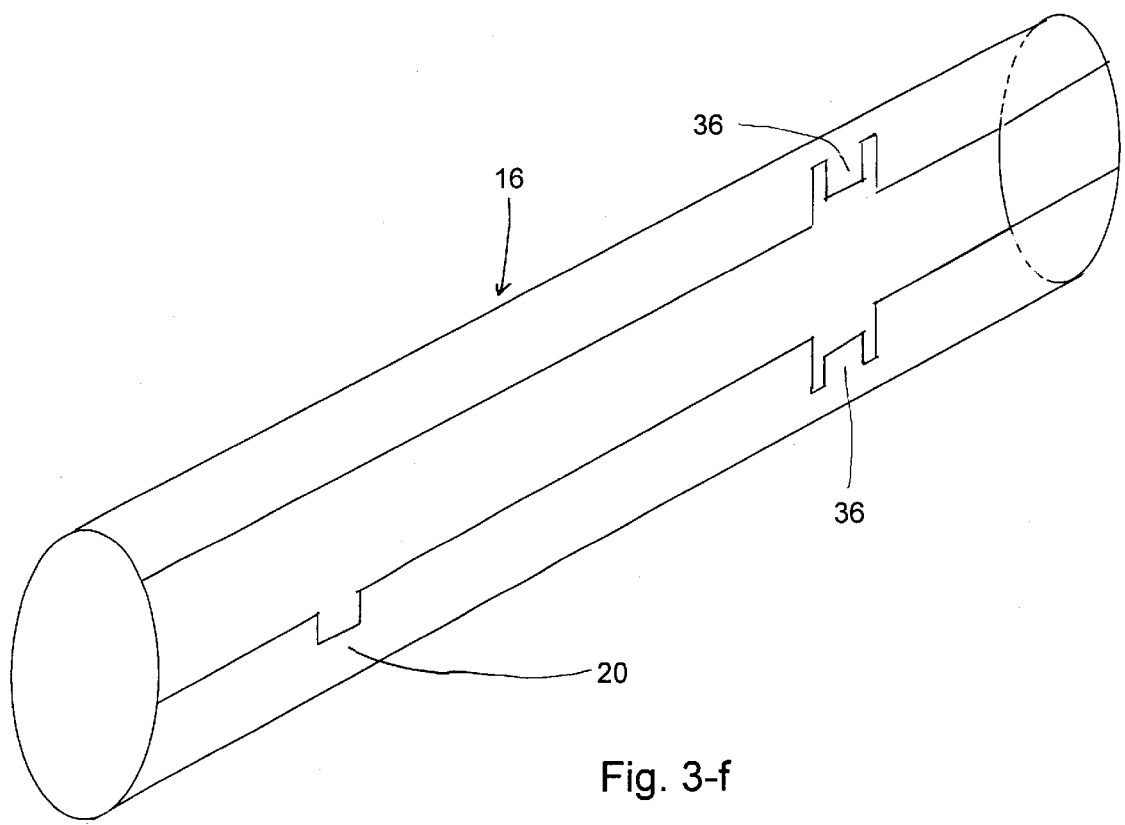
Fig. 3-f

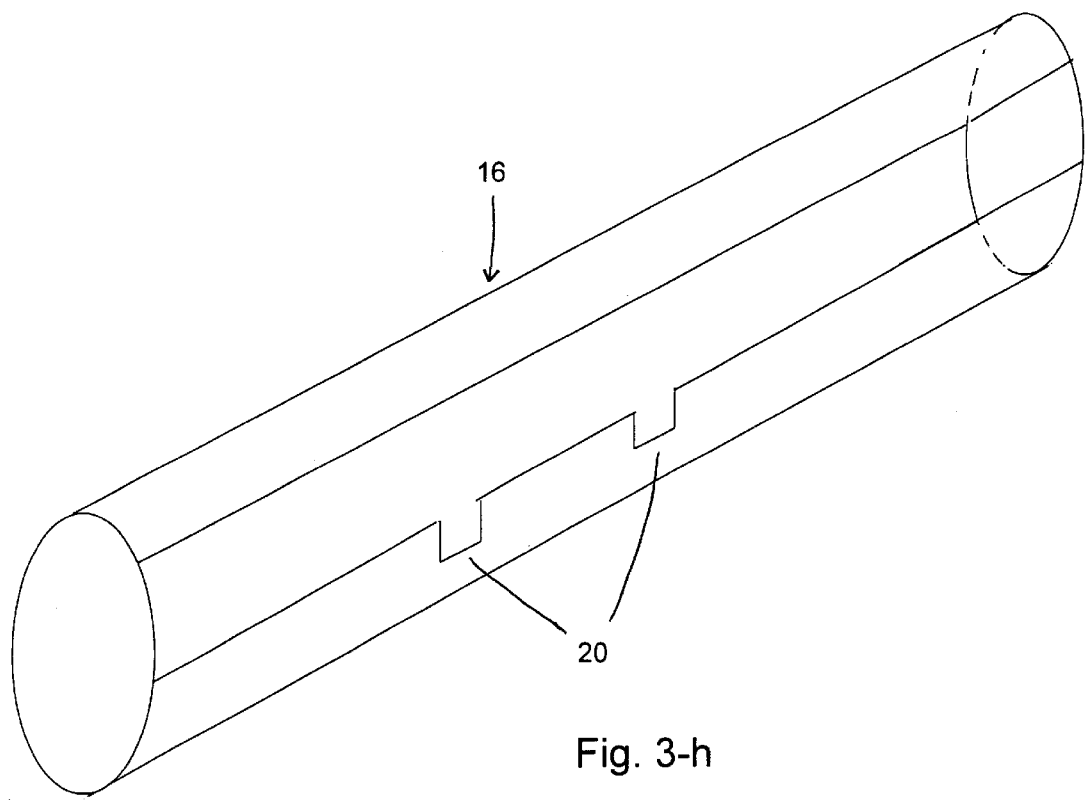
Fig. 3-h

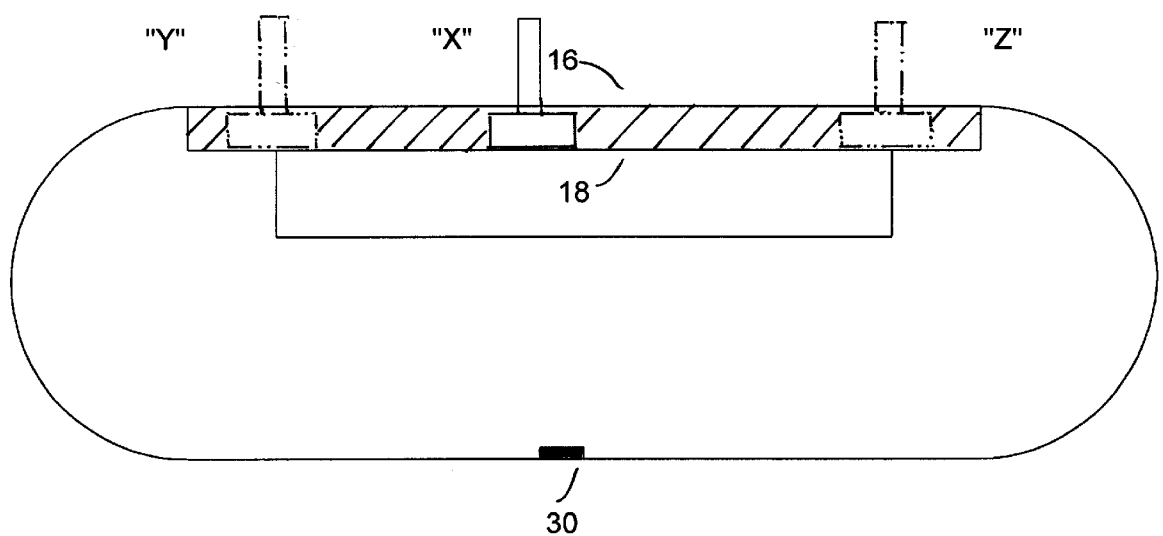
Fig. 4-a

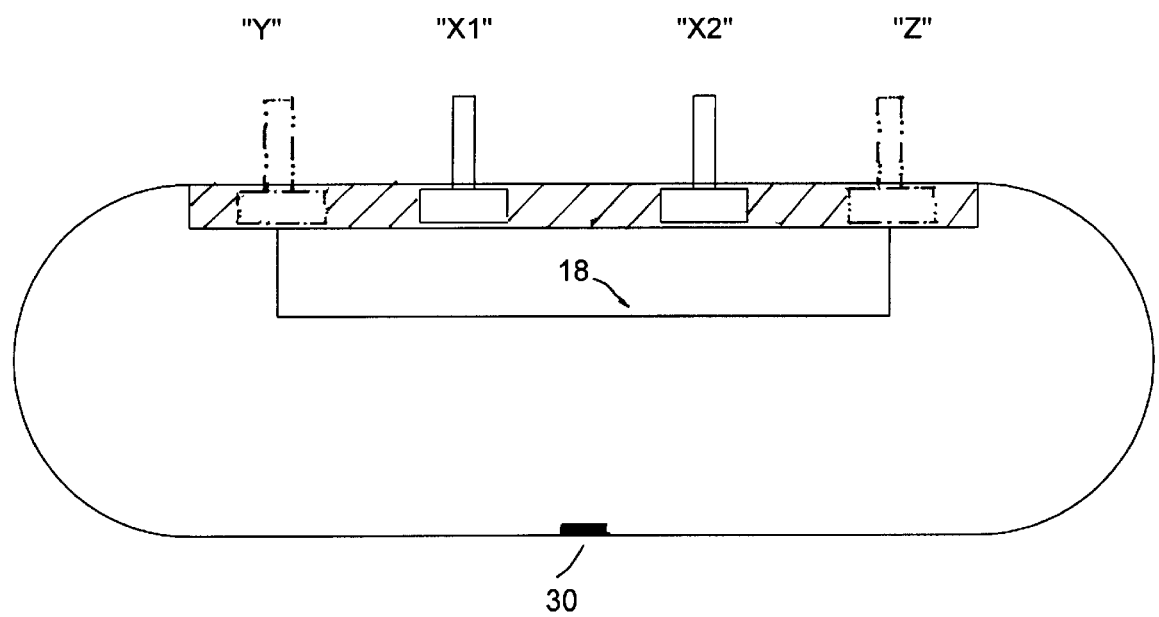
Fig. 4-b

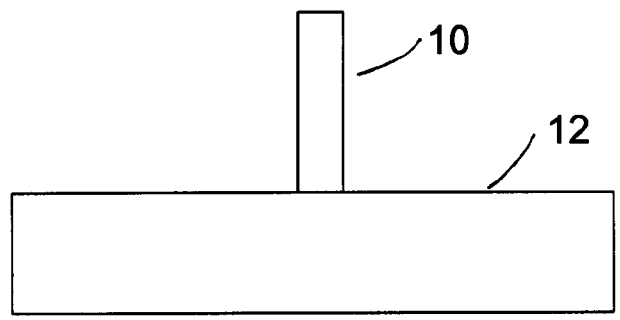
Front
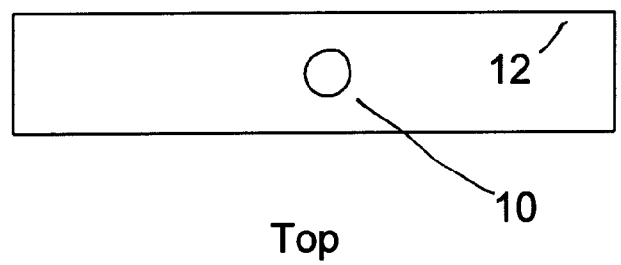
Top
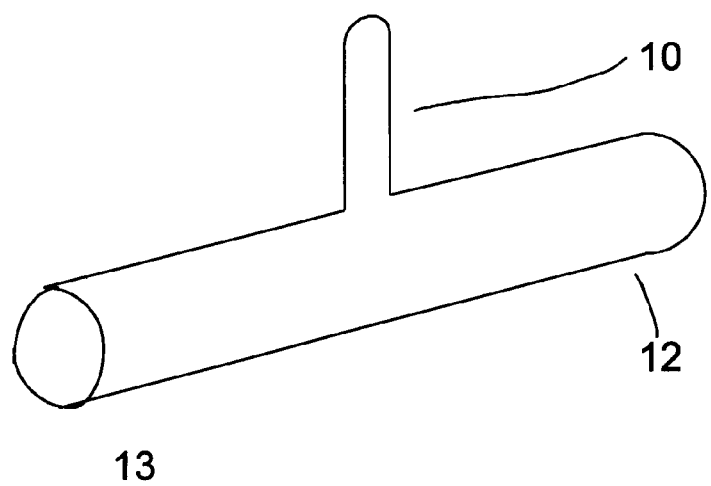
Angular View
Fig. 4-c

VISOR WITH LONGITUDINAL MOVEMENT SYSTEM

This application is a continuation is part of Ser. No. 09/027,971 filed Feb. 23, 1998, now abandoned.

BACKGROUND OF THE INVENTION

Over the years of technological developments, new designs and inventions have improved vehicle comfort and safety. Unfortunately, not enough efforts have been made to protect the driver and passengers from glare, direct sunlight, and possible damage to face skin due to sun exposure from the side windows at the same time protecting from front windshield.

This invention relates to comfort and safety of vehicles. For this patent vehicles include the following vehicles but not limited to: cars, light trucks, sport utility vehicles, jeeps, mini-vans, farm vehicles including tractors, buses, earth moving vehicles, commuter trains, and trucks.

DESCRIPTION OF THE PRIOR ART

A number of prior art inventions relate to the factory mounted front visor (hereon called FMFV). For example, U.S. Pat. No. 5,259,657 to Arendt is illustrative of prior art where a 'Visor Extender' is designed to increase the area of protection. No significant modification was suggested. U.S. Pat. No. 5,379,929 to Eskandry has described a Multi-Functional Vehicle Visor Unit. U.S. Pat. No. 5,044,687 to Abu-shumays, U.S. Pat. No. 4,998,765 to VanOrder and others, and U.S. Pat. No. 5,409,285 to Snyder and Redder describe a sliding mechanism for front visor of vehicles. U.S. Pat. No. 5,186,512 to VandenBerge have explained a Rear Window Sliding Visor using a guide rail mechanism, which is mounted on the roof of the vehicle and allows vertical movement of the visor. U.S. Pat. No. 5,538,310 to Frankhouse have outlines a tracking mechanism on the roof of a vehicle through which sun visor can move. Frankhouse patent has a little similarity with this invention. Frankhouse invention requires installation of a concealed track inside the vehicle. This is a major and expensive procedure and deteriorate the inner beauty of the vehicle. Also, Frankhouse invention cannot protect from front and side at the same time, and cannot be installed without the cooperation of vehicle manufacturer. Similarly, U.S. Pat. No. 5,529,367 to VanOrder and U.S. Pat. No. 5,350,212 to Corn have explained moveable visor body for vehicles. Takahashi (405,104,949) has a visor with limited similarly with this invention. The differences between this invention and Takahashi is as follows:

This invention is very distinct in shape as well as utility. Rod 42 and transverse rod of Takahashi does not slide the visor blade. Actually a clip is attached to the transverse rod which is attached to the rod.

Rod 42 and 38A of Takahashi are part of much complicated system compare to this invention. The inventor feels that parts from the prior art cannot be compared with a unique purpose component of this invention. Invention should be looked as a complete whole, without combining references from several prior art inventions.

This invention is also distinct in shape, ease of manufacturing, unique resistance level, and extremely simple stowage system on the vehicle's roof.

There is no varying resistance level at Takahashi's patent. Takahashi has attached a clip 26 at grove 20 to move and stop visor blade. The clip 26 opens and closes to move the visor blade. This invention application has a new varying resistance railing which is durable and simple.

There is no mention of prior art, which directly relates to this invention. This invention shall improve prior art by offering an easy to manufacture and cheap visor system, which will cover front side window and rear side window by employing only one visor while another Visor offer protection from front windshield. Furthermore, Visor can provide total protection on front windshield if used as a replacement to FMFV. Finally, the Visor suggested by this invention could be put on a vehicle by a mechanic, since no major modification is required in the vehicle. Best results are achieved when Visor is installed by vehicle manufacturer. Above mentioned prior art inventions can be utilized only by the manufacturer of vehicles and cannot be sold by vehicle accessory suppliers. Also, the prior art does not offer a complete and comprehensive protection for driver and passengers from every direction.

SUMMARY OF THE INVENTION

The factory mounted front visor (FMFV) in a vehicle can be used to protect from the early morning and late afternoon sun from either the front windshield or the side windows. FMFV can not protect from both directions at the same time. It is a common observation that the driver or passenger keeps moving the FMFV from front to side and side to front because of the changing direction of the road and final destination of the driver. The need for protection from sun is paramount during three hours in early morning and three hours before sunset, which are normal commuting and working hours for millions of vehicle drivers and passengers. Number of hours of exposure from sun varies depending on geographical location and the month of the year.

FMFV partially cover the windshield and does not provide full protection. Visor With Longitudinal Movement System can slide left and right along the windshield, thus providing full protection to driver or passenger sitting on the front seats. In an alternate embodiment, Visor can be used for total sun protection from front windshield.

The inventor felt a need to design an inexpensive and easy to manufacture Visor for the side windows or windshield so the driver or passengers do not have to constantly relocate the FMFV from front to side and side to front. The Visor will be permanently mounted in vehicles by the manufacturer of vehicle or added to vehicles by a professional vehicle mechanic. Only one Visor can be used for front side window as well as rear side window because of longitudinal movement mechanism. In case of tractors, buses, trucks, light trucks, and earth-moving vehicles, Visor will protect entire front side windows. The inventor started working on this project around Aug. 29, 1996. After months of careful observation of most of the available vehicles and analyses of visor movement, the design was completed on Feb. 27, 1997. Visor is available for driver as well as passenger side. Visor can be made of same material and color as the FMFV and roof of the vehicle. Also, Visor can be made of matching material and color as the FMFV and roof of the vehicle. Visor can slide forward or backward depending whether to protect from the sun glare coming through the front side windows or rear side windows.

One circular roller is used for smaller Visor while two circular rollers are used for longer Visor and to provide added support. (FIG. 1-a, 1-b) Railing is permanently attached to the Visor blade and circular roller can slide within the railing. While sliding in the railing, circular roller temporary stops at desired positions because of increased resistance in the inner surface of railing.

One of the embodiments of this invention is ellipse shape on both ends of rectangular Visor (FIG. 1-*f*). The size and shape could be modified depending on the size and model of vehicle. As described in the background section, driver and passenger on the front seat need protection from the sun glare and rays coming from side window. Also, passengers sitting on the rear seat may also need protection from sun. This is particularly true for infants in their car seat, business executives driven by chauffeurs, passengers in a taxicab, family members in a mini-van, etc.

OBJECTS AND ADVANTAGES

Accordingly, besides the benefits of the Visor described earlier, several objects and advantages of the invention are mentioned below:

1. Protect from sun glare from the side windows while other Visor protects from the front windshield.
2. No need to intermittently readjust the FMFV from front to side and side to front as the road curvature change or the vehicle makes turns to reach the final destination.
3. Protect the facial skin from cancer and rash causing sunrays, particularly driver and passenger with sensitive skin.
4. Improve visibility and safety of the driver as the driver does not has to look in the sun bothering him from the front or the side of the vehicle. Sun glare can momentarily blind the driver.
5. The said invention will not block the side vision and glance in the side mirrors mounted on the exterior of the vehicle, as the said invention (Visor) covers only the top of the side window.
6. The Visor is made of the same material and color, or matching material and color as the FMFV and the roof of the vehicle, so the said invention blends in with the interior of the vehicle and does not alter the aesthetic appeal of vehicle.
7. The Visor can be folded and stowed on the roof of vehicle while not used.
8. As a preferred embodiment, one Visor is needed on each side of the vehicle. In case of cars, mini-vans, sport utility vehicles, and similar vehicles the said invention can protect the driver or passenger in the front or rear seats.
9. Safety conscious drivers, particularly in the top of the line vehicle models prefer this Visor.
10. The invention has incorporated a cost effective and easy to manufacture longitudinal movement system. This system can also be used on the front windshield of vehicle as well as on side windows, or any other place in the vehicle.
11. Ellipse shape on both ends provide better protection and consistent with circular shape designs of many vehicle interior and dashboard.

BRIEF DESCRIPTION OF THE DRAWING FIGURES

FIG. 1-*a* shows the Visor blade and its position on the driver side of vehicle, while covering driver side-window (unfolded position). One mounting piece and roller is used.

FIG. 1-*b* shows the Visor blade and its position on the driver side of side window of vehicle, while when slide to the front side-window (unfolded position). Two mounting piece and rollers are used.

FIG. 1-*c* shows the Visor blade and its position on the windshield of vehicle, driver side and passenger side, while in use (unfolded position). Two mounting pieces and rollers are used.

FIG. 1-*d* shows the Visor blade and its position on the windshield of vehicle, driver side and passenger side, while in use (unfolded position). One mounting piece and roller is used.

FIG. 1-*e* shows the Visor blade and its position on the driver side of vehicle at original position (unfolded position).

FIG. 1-*f* shows the Visor blade and its position on the driver side of vehicle when slide to the rear side-window (unfolded position).

FIG. 1-*g* shows rectangular shape blade with elongated ellipse shape on both ends.

FIG. 2 shows frame of the commonly used mounting piece mounted on the area above the side window or windshield of vehicle, and circular roller attached with mounting piece.

FIG. 3-*a* shows the side cross-sectional views of the railing at no resistance positions with circular roller.

FIG. 3-*b* shows the side cross-sectional views of the railing at increased resistance positions with circular roller.

FIG. 3-*c* shows front cross-sectional view of circular railing showing positions of four increased resistance area for two rollers mechanism.

FIG. 3-*d* shows front cross-sectional view of circular railing showing positions of three increased resistance area for one roller mechanism.

FIG. 3-*e* shows circular railing with one grove to be used on side window or windshield.

FIG. 3-*f* shows circular railing with two groves and opening for detachment of the second roller from circular railing to rotate the visor blade from windshield to side window.

FIG. 3-*g* shows cross-sectional view of the detachment of the second roller from the opening on the railing.

FIG. 3-*h* shows circular railing with two groves to be used on side window.

FIG. 4-*a* is the front cross-sectional view of the Visor indicating all three possible positions of roller and the attachment of circular railing on Visor blade, using one roller.

FIG. 4-*b* is the front cross-sectional view of the Visor indicating all four possible positions of roller using two rollers and the attachment of railing on Visor blade.

FIG. 4-*c* shows enlarged front, top, and angular views of the roller and vertical rod.

LIST OF REFERENCE NUMBERS

10=Vertical rod of roller to be fixed in mounting piece 34.
12=Circular roller used for sliding, attached with vertical rod 10.
13=Rounded corners of circular roller 12.
14=Visor, front view.
16=Railing mounted on horizontal side of the Visor.
17=Inner surface of railing 16.
18=Rectangular strip connecting railing 16 with the Visor frame.
20=A grove on railing 16 to fold the Visor using vertical rod 10.

22=Inside railing 16 area with increased resistance for stowage position.
24=Inside railing 16 area with increased resistance for front movement (side-window) or right movement (windshield).
26=Inside railing 16 area with increased resistance for rear movement (side window) or left movement (windshield).
28="Velcro" hook on the roof of vehicle.
30="Velcro" hook on the side opposite to the railing side of the Visor, pushed in 28.
32=Factory Mounted Front Visor (FMFV).
34=Mounting piece be connected with vertical rod 10 and vehicle roof.
36=Bigger opening on railing 16 to detach roller 12.
38=Tip of ellipse shape.
42=Rotational mounting piece be connected with vertical rod 10 and vehicle roof, and used above front windshield.
44=Stationary mounting piece be connected with vertical rod 10 and vehicle roof, and used above front windshield when two rollers are employed.

DETAILED DESCRIPTION OF THE ILLUSTRATED EMBODIMENTS

In all figures, similar reference characters denote similar elements throughout the several views.

It was decided to use a special mechanism which will allow Visor to slide longitudinally (front-back) and stowed on the roof between front and rear window while not in use. In an alternative embodiment, Visor slide longitudinally (right-left) on windshield as a windshield visor, and can be stowed on the roof above the windshield frame. A commonly used mounting piece 34 is described in FIG. 2. The visor mounting piece 34 is installed slightly above top edge of side window as shown in FIG. 1-a. Mounting piece 34 is strong enough since only one piece will hold the weight of the Visor. In an alternative embodiment two mounting pieces 34 and two rollers 12 are used for longer Visor blades for added security and reduction of vibration and rattling sound. (FIGS. 1-b, 1-c, 1-e, 1-f) The Visor blade can slide from front side window position to rear side window position (FIG. 1-f) or front side window (FIG. 1-b). The position where Visor with two rollers 12 is shown in FIG. 1-e. In one of the alternative embodiment two mounting pieces and two rollers are used above the windshield of the vehicle, thus Visor protects from sun light from windshield. (FIG. 1-c) In another embodiment only one roller is used on the front windshield. (FIG. 1-d) A small rod 10 is vertically extended from the mounting piece on which a circular shape roller 12 is attached making a 90-degree angle. Rod 10 and circular roller 12 are described from various positions in FIG. 4-c. Circular roller 12 can slide inside the railing 16, and holds Visor blade 14. Rod 10 and roller 12 are made of strong solid material. Preferred embodiment is to manufacture rod 10 and roller as one piece using a coarse polymeric material for increased friction and reduced rattling sound. Roller 12 has rounded corners (edges) 13 to avoid damage to inner surface of railing 16 and ease of movement from the increased friction area.

On the straight horizontal surface of Visor blade 14, a smooth and hard railing 16 with circular inner surface is connected with a rectangular strip 18, and the rectangular strip 18 is screwed with the inside template of Visor blade 14. Railing 16 is open on the top equal to the diameter of the rod 10. One of the embodiments is that railing 16 and rectangular strip 18 are made of a smooth polymeric material. The railing has one or two (for one or two rollers) narrow openings (grove) 20 to accommodate vertical rod 10 while folding the Visor for stowage on the vehicle roof. Railing with one grove 20 is shown in FIG. 3-e. Railing with two groves is shown in FIG. 3-h. Railing with two groves used on the windshield is shown in FIG. 3-f. The second roller is detached from the opening in railing as shown in FIG. 3-g.

Visor can slide with very little resistance forward and backward. The resistance is increased on both ends of the railing 16 at positions 24 and 26 to provide firmness while the Side Visor is used on the front window or rear window. When Visor is used on the front windshield, there is increased resistance on both ends of the railing 16 at positions 24 and 26 to provide firmness for right or left positions of Visor. Left and right movement on the front windshield is much less than front or back movement of railing when used on side windows, because one Visor blade is covering the front and rear side windows. Railing is closed from both ends to avoid slipping of rollers away from railing. The resistance is also increased at resting position of the Visor, which are in the railing. (FIGS. 3-a, 3-b) Cross-section side view at all three and four locations is shown in FIGS. 3-d and 3-c. Increased push or pull will be required to slide circular roller 12 back and forth by bringing circular roller out of increased resistance areas 22, 24, 26. The movement of one circular roller 12 and attachment of railing 16 on Visor 14 is illustrated in FIG. 4-a. Roller can take the position of 'Y' or 'Z' as a result of longitudinal movement of the roller. Resting position for the roller is 'X'. The movement of two circular rollers 12 and attachment of railing 16 on Visor 14 is illustrated in FIG. 4-b. Two circular rollers are at 'X1' and 'X2' positions. There are two possibilities of rollers 12 positions. First, roller from 'X2' position will move to 'Z' and roller 12 from 'X1' position to 'X2' position. Second, roller 12 from 'X1' position will move to 'Y' positions and roller 12 from 'X2' position will move to 'X1' position. That is how Visor will move (right-left) on windshield use, and front-backward on side windows.

Because of increased resistance between roller 12 and inner surface of railing 17 at stowage position 22 (one or two rollers), Visor is pushed up and stowed at the roof. A set of Velcro hooks are provided, for protection, on the other horizontal surface of Visor 30 adjacent to railing 16 and roof of vehicle 28. The Velcro hook 30 can be pushed in hook 28 to prevent accidental unfolding of Visor.

When Visor is used on front windshield with one roller 12, only one rotational mounting piece is used. The Visor uses a ratable mounting piece 42, which will allow Visor to slide left or right and rotate to side window if the need arises. In the absence of permanently mounted Visor on side windows, the front windshield Visor can be rotated to side window. Before rotating Visor to the side, roller must be in increased resistance area 24. If two rollers are employed on front windshield Visor, the second roller is attached to the stationary-mounting piece 44. The Visor can be detached by pulling out from stationary-mounting piece 44 at predetermined place 36 where the opening is made bigger, so the roller 12 can be pulled-out or pushed-in, and than rotate to the side window by the help of the ratable mounting piece 42.

Preferred embodiment of Visor is ellipse shape on both ends of rectangular Visor 14, when used on windshield or side window, make it easier to unfold and fold, and provide user better protection from sun. Increased protection is provided to the driver and passenger by extended ellipse shape 38 without hindering the view. (FIG. 1-g) Rectangular shape blade with elongated ellipse on both ends can be used as a side window Visor, front windshield, or other places where Visors are needed in vehicles.

It will be understood that each of the elements described above, or two or more together may also find a useful application in other type of methods and products differing from the type described above.

It is to be understood that the present invention is not limited to the sole embodiments described above. The claims appended hereto are meant to cover modifications and changes within the sprit and scope of the present invention.

What is claimed is new and desired to be protected by a Letter Patent as set forth in the appended claims:

1. A visor for attachment to a vehicle above a window or windshield comprising: a cylindrical slide, a rod extending vertically from the slide to form a substantially inverted T-shaped structure, the rod attached to a mounting piece for fixing to a vehicle body, a hollow part cylindrical railing of greater length than the slide, the railing having a wall section thereof open to allow the vertical rod to pass therethrough with the slide nested within the railing, the railing attached to an upper edge of a visor body, wherein the slide can be slid within the railing in order to move the visor body laterally to adjust the position thereof.

2. The visor of claim 1, further comprising a constricted section of the railing to secure the visor body in position.

3. The visor of claim 1, wherein the rod is pivotally attached to the mounting piece.

4. The visor of claim 3, wherein the railing contains two slides with a vertical rod for each slide, and a mounting piece for each rod, and wherein the railing has an enlarged opening to allow one rod and slide to disengage the railing while the other rod pivots on its mounting piece for movement of the visor body to a pivoted position.

5. The visor of claim 1, wherein the railing contains two slides, each slide with a vertical rod attached to a mounting piece and the visor body is slid on both slides.

6. The visor of claim 1, wherein the railing has a groove extending from the open wall section to allow the rod to enter within the groove and the visor body to pivot to a stored position.

7. The visor of claim 1, wherein the slide is manufactured of a polymeric material.

* * * * *